US010915626B2

(12) United States Patent
Tang et al.

(10) Patent No.: US 10,915,626 B2
(45) Date of Patent: *Feb. 9, 2021

(54) GRAPH MODEL FOR ALERT INTERPRETATION IN ENTERPRISE SECURITY SYSTEM

(71) Applicant: NEC Laboratories America, Inc., Princeton, NJ (US)

(72) Inventors: LuAn Tang, Pennington, NJ (US); Zhengzhang Chen, Princeton Junction, NJ (US); Zhichun Li, Princeton, NJ (US); Zhenyu Wu, Plainsboro, NJ (US); Jumpei Kamimura, South Brunswick, NJ (US); Haifeng Chen, West Windsor, NJ (US)

(73) Assignee: NEC Corporation

( * ) Notice: Subject to any disclaimer, the term of this patent is extended or adjusted under 35 U.S.C. 154(b) by 224 days.

This patent is subject to a terminal disclaimer.

(21) Appl. No.: 16/161,769

(22) Filed: Oct. 16, 2018

(65) Prior Publication Data

US 2019/0121971 A1    Apr. 25, 2019

Related U.S. Application Data

(63) Continuation of application No. 16/161,564, filed on Oct. 16, 2018.

(60) Provisional application No. 62/576,148, filed on Oct. 24, 2017.

(51) Int. Cl.
*G06F 21/55* (2013.01)
*H04L 29/06* (2006.01)
*H04L 12/24* (2006.01)
*G06F 21/57* (2013.01)

(52) U.S. Cl.
CPC ........... *G06F 21/552* (2013.01); *G06F 21/57* (2013.01); *H04L 41/065* (2013.01); *H04L 41/0613* (2013.01); *H04L 41/142* (2013.01); *H04L 63/1416* (2013.01); *H04L 41/22* (2013.01)

(58) Field of Classification Search
CPC . H04L 63/1416; H04L 63/104; G06F 21/552; G06F 21/57
USPC ......................................................... 726/22
See application file for complete search history.

(56) References Cited

U.S. PATENT DOCUMENTS

| | | |
|---|---|---|
| 8,881,288 B1 | 11/2014 | Levy et al. |
| 8,973,100 B2 * | 3/2015 | Rubinstein .............. H04L 63/08 705/319 |
| 9,032,518 B2 | 5/2015 | Planck et al. |
| 9,142,102 B2 | 9/2015 | Trossbach, Jr. et al. |
| 9,298,928 B2 * | 3/2016 | Borghetti .............. G06F 21/577 |
| 9,325,568 B2 * | 4/2016 | Racz .................. H04L 41/0631 |

(Continued)

*Primary Examiner* — Longbit Chai
(74) *Attorney, Agent, or Firm* — Joseph Kolodka

(57) ABSTRACT

A computer-implemented method for implementing alert interpretation in enterprise security systems is presented. The computer-implemented method includes employing a plurality of sensors to monitor streaming data from a plurality of computing devices, generating alerts based on the monitored streaming data, and employing an alert interpretation module to interpret the alerts in real-time, the alert interpretation module including a process-star graph constructor for retrieving relationships from the streaming data to construct process-star graph models and an alert cause detector for analyzing the alerts based on the process-star graph models to determine an entity that causes an alert.

4 Claims, 10 Drawing Sheets

(56) References Cited

U.S. PATENT DOCUMENTS

| | | |
|---|---|---|
| 9,607,074 B2 | 3/2017 | Tee et al. |
| 9,794,158 B2 | 10/2017 | Bell et al. |
| 2016/0308725 A1* | 10/2016 | Tang .................. H04L 63/1425 |
| 2017/0155538 A1 | 6/2017 | Tee et al. |
| 2017/0235596 A1 | 8/2017 | Vankadaru et al. |
| 2017/0288974 A1 | 10/2017 | Yoshihira et al. |

* cited by examiner

GRAPH MODEL FOR ALERT INTERPRETATION IN ENTERPRISE SECURITY SYSTEM

BACKGROUND

Technical Field

The present invention relates to enterprise networks and, more particularly, to implementing graph-based alert cause detection in enterprise security systems.

Description of the Related Art

Computer systems are vulnerable to attack, misuse and penetration by outside sources and persons who have internal access to physical systems. Billions of dollars are lost every year repairing systems hit by such attacks, particularly when vital systems are disrupted. It is necessary to determine that an intrusion has occurred and identify the type of intrusion. An intrusion detection system (IDS) is a device or software application that monitors network and/or system activities for malicious activities or policy violations and reports events which signal possible intrusion. Intrusion detection is focused on identifying possible incidents by logging information about them, and reporting attempts to engage in unauthorized activities that may compromise a network or system. Once a possible intrusion event is detected, effective protocols should be in place and personnel should quickly carry out intrusion detection protocols. Monitoring personnel who respond to the first sign of an intrusion are often useful to carrying out broader protocols that combat terrorism, cyber-warfare and other malicious activity. However, monitoring personnel often do not have specific technical backgrounds that allow them to quickly assess messages and alerts that reflect an imminent system intrusion.

Monitoring event logs and alerts is tedious and labor intensive, and requires the use of monitoring staff lacking specific technical knowledge. Event logs and messages must be discerned by monitoring personnel who must then convey critical system intrusion information to higher level staff. Enormous staffing resources are required for these monitoring functions.

SUMMARY

A computer-implemented method for implementing alert interpretation in enterprise security systems is presented. The method includes employing a plurality of sensors to monitor streaming data from a plurality of computing devices, generating alerts based on the monitored streaming data, automatically analyzing the alerts, in real-time, by using a graph-based alert interpretation engine employing process-star graph models, retrieving a cause of the alerts, an aftermath of the alerts, and baselines for the alert interpretation, and integrating the cause of the alerts, the aftermath of the alerts, and the baselines to output an alert interpretation graph to a user interface of a user device.

A computer-implemented method for implementing alert interpretation in enterprise security systems is presented. The method includes employing a plurality of sensors to monitor streaming data from a plurality of computing devices, generating alerts based on the monitored streaming data, employing an alert interpretation module to interpret the alerts in real-time, the alert interpretation module including: a process-star graph constructor for retrieving relationships from the streaming data to construct process-star graph models, an alert cause detector for analyzing the alerts based on the process-star graph models to determine an entity that causes an alert, an aftermath tracer for monitoring all the following events of the entity that causes the alert, and an information integrator for integrating alert cause, aftermath, and baseline information to generate a result graph on a visualization component to allow users to interpret the alerts.

A computer-implemented method for implementing alert interpretation in enterprise security systems is presented. The method includes employing a plurality of sensors to monitor streaming data from a plurality of computing devices, generating alerts based on the monitored streaming data, automatically analyzing the alerts, in real-time, by using a graph-based alert interpretation engine employing process-star graph models, retrieving a cause of the alerts, an aftermath of the alerts, and baselines for the alert interpretation, the cause of the alerts determined based on entity seniority, entity stability, and entity similarity, computing abnormal scores from the entity seniority, the entity stability, and the entity similarity, and integrating the cause of the alerts, the aftermath of the alerts, and the baselines into an alert interpretation graph output to a user interface of a user device.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The exemplary embodiments of the present invention address alert interpretation in enterprise security systems. In a large enterprise security system, multiple detectors or sensors are deployed to monitor the data from thousands of computers and devices. These detectors or sensors generate different kinds of alerts based on monitored data. One issue in real applications relates to alert interpretations. Since most alerts are generated in a black-box manner (e.g., they are detected based on complex algorithms or domain specific rules), it is difficult for end users with limited domain knowledge to understand such alerts and take appropriate actions.

The exemplary embodiments of the present invention introduce models and methods to interpret the alerts in enterprise security systems so that the end users can easily understand such alerts. To achieve this, the exemplary system has to provide information to answer at least three questions: (1) what is the cause of the alert? (2) what is the aftermath of the alert? and (3) what is a normal situation if there was no such alert? To answer these questions, a Graph-based Alert Interpreting Engine (GAIE) can be employed to automatically analyze the alerts and retrieve the elements (e.g., cause of the alert, aftermath of the alert and baseline) for alert interpretation. GAIE utilizes a model of process-star graphs to store the baselines, conduct reasoning on the graph model to find out problematic entities that cause the alerts, and trace following events to evaluate the aftermath. Finally, the system integrates all the information as an illustration graph 3155 or an alert interpretation graph 3155 to aid end users to understand the alerts. The exemplary embodiments of the present invention are employed as a core engine of an Automatic Security Intelligence (ASI) system for security solutions.

Figure 1:
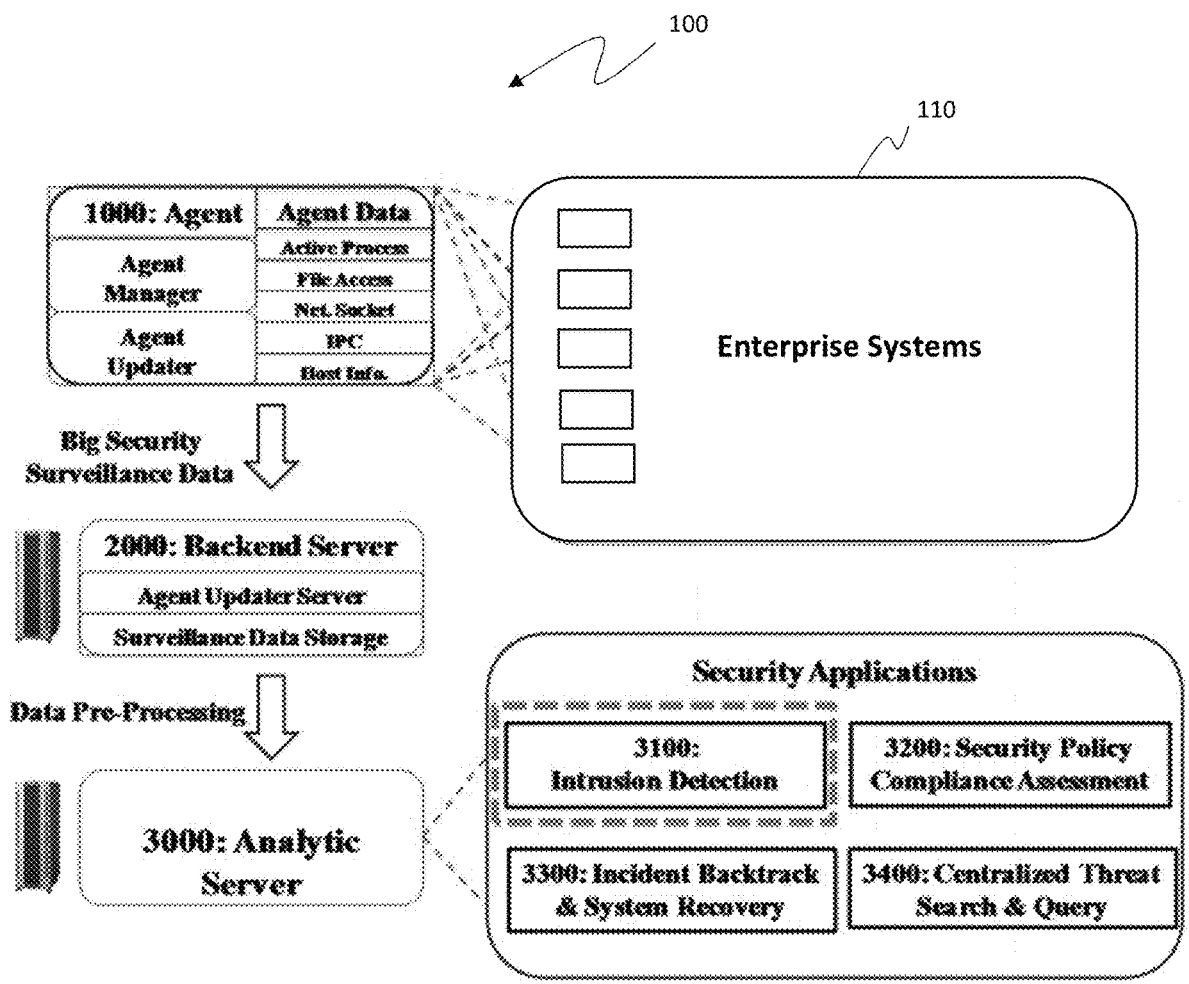
FIG. 1 is an example architecture of an automatic security intelligence system, in accordance with embodiments of the present invention.

FIG. 1 shows the overall architecture 100 of the Automatic Security Intelligence (ASI) system. The components are: agent 1000 installed in each host of the enterprise network 110 to collect operational data, backend servers 2000 that receive the data from agents, pre-process them, and send such processed data to the analysis server 3000, which runs the security application programs to analyze the data. The intrusion detection engine 3100 is an application for detecting any possible intrusion from sources inside/outside the enterprise network 110.

Figure 2:
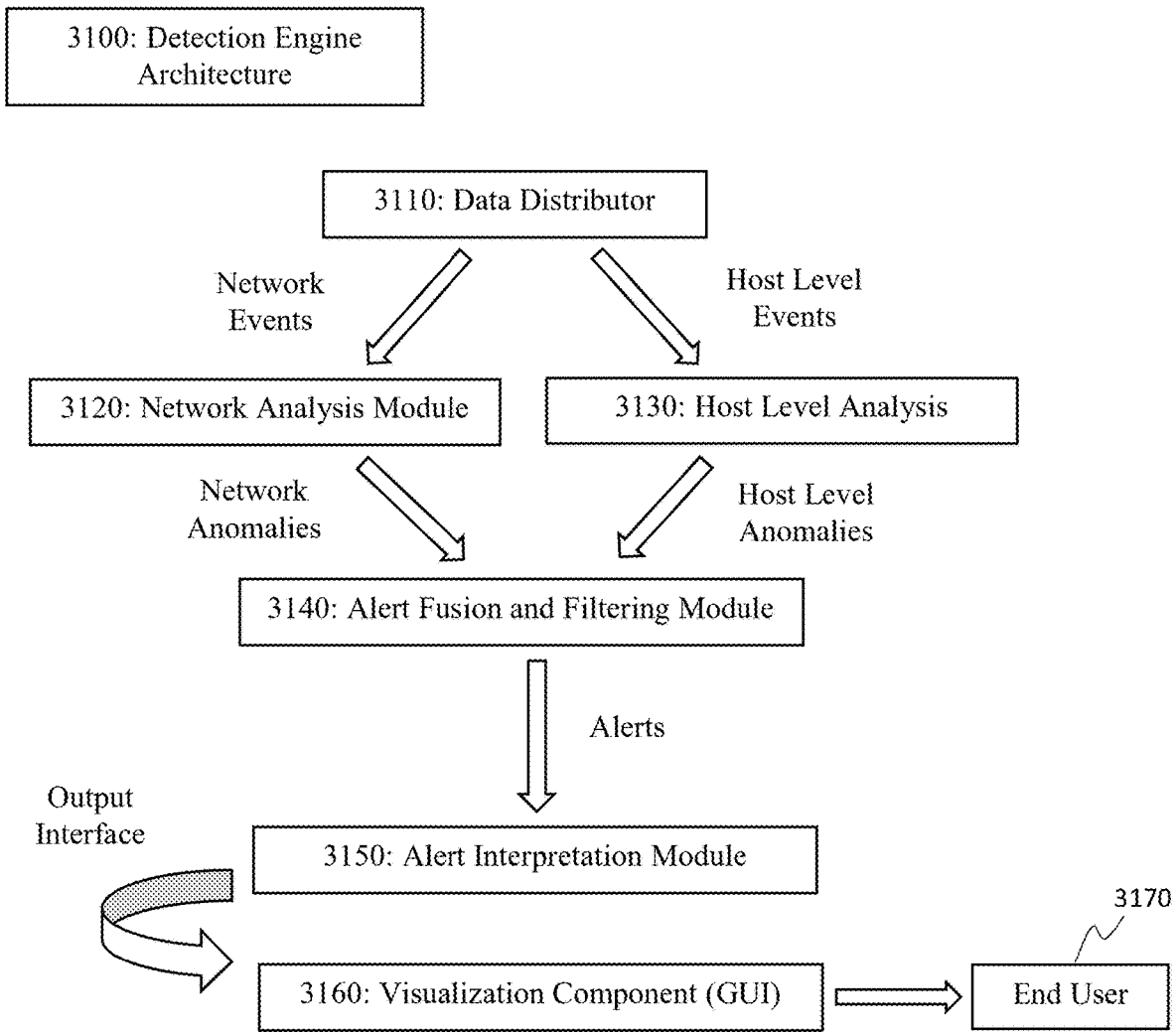
FIG. 2 is an example architecture of an intrusion detection engine, in accordance with embodiments of the present invention.

FIG. 2 illustrates the architecture of an intrusion detection engine. In one example, there can be six modules in the engine: (1) the data distributor 3110, which receives the data from the backend server and distributes the corresponding data to the network or host level modules; (2) the network analysis module 3120, which processes the network events and detects the abnormal connections; (3) the host level analysis module 3130, which processes the host level events, including user-to-process, process-to-file, user-to-registry, etc. The abnormal host level events are then generated; (4) the alert fusion and filtering module 3140, which integrates the network and host level anomalies and refines them as trustworthy alerts; (5) the alert interpretation module 3150, which conducts reasoning for interpretation; and (6) the visualization module 3160, which outputs the results to end users 3170. The technologies of the exemplary embodiments are the main parts of alert interpretation module 3150.

Figure 3:
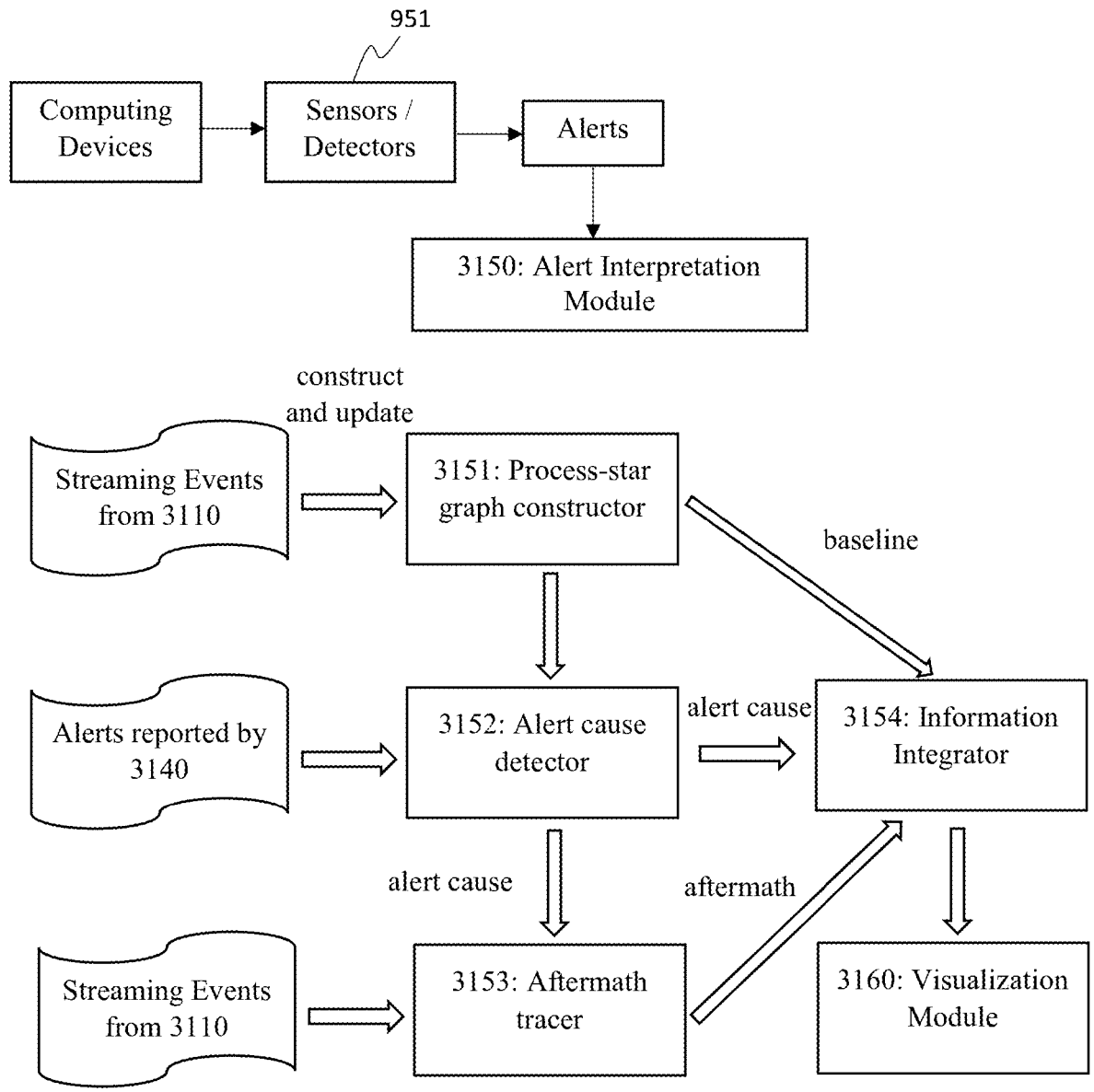
FIG. 3 is an example architecture of an online alert fusion module, in accordance with embodiments of the present invention.

FIG. 3 illustrates the architecture of the alert interpretation module 3150. In one example, there can be four components: (1) the process-star graph constructor 3151, which retrieves relationships from streaming events of the data distributor 3110 and constructs the graph model. This component also provides baselines as comparison for the alerts; (2) the alert cause detector 3152, which takes the reported alerts as input, analyzes them with the process-star graphs and finds out the entity that causes alert; (3) the aftermath tracer 3153, which monitors all the following events of the problematic entity over streaming data; and (4) the information integrator 3154, which summarizes all the information to generate a result graph to interpret alerts and display them on a visualization module 3160.

The components of FIG. 3 can address the following questions:

(1) How to construct a model for the relationship among the processes, users, network connections and other entities? (Solved by 3151)

(2) How to construct the baselines and detect the alert cause? (Solved by 3152)

(3) How to trace the aftermath of the alert and integrate the results to interpret the alerts? (Solved by 3153 and 3154)

The following pertains to constructing and maintaining the relationship model of processes, users, network connections and other entities over streaming data (3141).

The ASI agents are installed on the hosts of enterprise system 110 (FIG. 1). The ASI agents collect all the activities of the processes running on the hosts and send all the activities to the analysis server.

Regarding the process definition, a process p is a 5-tuple, p=<name, path, signature, start_time, user>, where "name" is the file name of the process, "path" is the path of the corresponding executable file, "signature" is the hash signature of the process's binary file, "start_time" records the timestamp that the process is executed, and "user" is the one who runs the process.

Besides the process, there are other entities, including the network socket and the file.

Regarding the network socket definition, a network socket s is a 5-tuple, s=<src-ip, src-port, dst-ip, dst-port, protocol>, where "src-ip" and "src-port" are the IP address and port of the source host, "dst-ip" and "dst-port" are the IP and port of the destination host, and "protocol" indicates the type of connection (e.g., transmission control protocol (TCP) or user datagram protocol (UDP)).

Regarding the file definition, a file f is a 4-tuple, f=<path, type, address, owner>, where "path" is the file path, "type" indicates which category the file belongs to (e.g., executables, documents, libraries, etc.), "address" is the physical address (e.g., volume id) of the file and "owner" is the user that owns/creates the file.

With the definitions of entities, now the ASI events can be defined as follows.

Regarding the definition for monitoring event, a monitoring event e is a 5-tuple, e=<host_id, timestamp, process, object, alert_label>, where "host_id" indicates the host where the ASI event is reported, "timestamp" records the time of the event, "process" is the subject of the event (e.g., the one that conducts the activity), the "object" of event is an entity, either be a process, or be a network socket or file, and the "alert_label" is a binary value to indicate whether the event triggers the alert from a detector or not.

According to the objects, the monitoring events can be classified into at least three categories: (1) the process execution events that one process starts another process; (2) the network communication events that a process employs the network sockets to communicate to another host; and (3) the file access events that the process reads/writes to a file. If the event triggers an alert for a certain detector, the alert_label will be 1 and this event is called as an alert event.

In a first example, with reference to Table 1 below, Table 1 shows a list of ASI events from 11:30 am to 12:05 am on 2017 Jul. 29. The IP address is used as the id for hosts.

$e_1$ and $e_5$ are file access events, $e_3$ and $e_4$ are network communication events, and $e_2$ is a process execution event.

TABLE 1

List of ASI Events

| Event | host-id(ip) | process | object | timestamp |
|---|---|---|---|---|
| $e_1$ | 138.15.165.22 | chrome.exe | File at C:\Windows\System32\drivers\afd.sys | 2017-7-29 11:30:12 |
| $e_2$ | 138.15.165.38 | chrome.exe | Process as C:\Windows\System32\spoolsv.exe | 2017-7-29 11:35:09 |
| $e_3$ | 138.15.165.63 | chrome.exe | Socket as 138.15.165.235:8080 | 2017-7-29 11:40:56 |
| $e_4$ | 138.15.165.22 | chrome.exe | Socket as 101.125.228.17:80 | 2017-7-29 11:52:19 |
| $e_5$ | 138.15.165.22 | chrome.exe | File at C:\Windows\System32\program\readme.txt | 2017-7-29 12:02:09 |

By analyzing large amounts of collected ASI events, the following observations can be made:

Observation concerning the process-object binding: the processes and their objects are with certain binding patterns. For example, some processes only access a set of files located in a specific folder, other processes only connect to the socket of specific destinations and ports.

Based on the above observation, the process-star graph can be employed to model the normal patterns of the process in the enterprise system 110 (FIG. 1).

Concerning the definition for the process-star graph, given a process p, the process-star graph $G_p = <v_p, V_o, E>$, where $v_p$ is the central node that represents process p, $V_o$ is the set of entity nodes that have been the object of process p in monitoring events and E is the set of edges between process p and $V_o$. A node v is a 3-tuple, v=<entity-id, type, last-event-time>; an edge l is a 4-tuple, l=<edge-id, dst-node-id, first-event-time, lastest-event-time>.

Note that, since the process p is the subject for all the object entities, it is the src-node for all edges. Thus, the src-node does not need to be recorded in edge l. In this way, the process node p is located in the center of the graph and other object entities surround p. This is the reason this is referred to as a process-star graph.

Another observation made from the example above pertains to the files.

The second observation relates to file aggregation, where several different files share common parts in the file path, e.g., they belong to the same folder.

In the process-star graphs, if a file node is created for each unique file, the number of file nodes may be too large. Thus, the files need to be aggregated based on their common folders. In a practical system, the files are aggregated by a two-level folder. If multiple files are located in the same two-level folder, they are merged as one. In the first example above, both the files: "C:\Windows\System32\program\readme.txt" and "C:\Windows\System32\drivers\afd.sys" are in the folder "C:\Windows\System32\". Thus they are merged as one file node.

Figure 4:
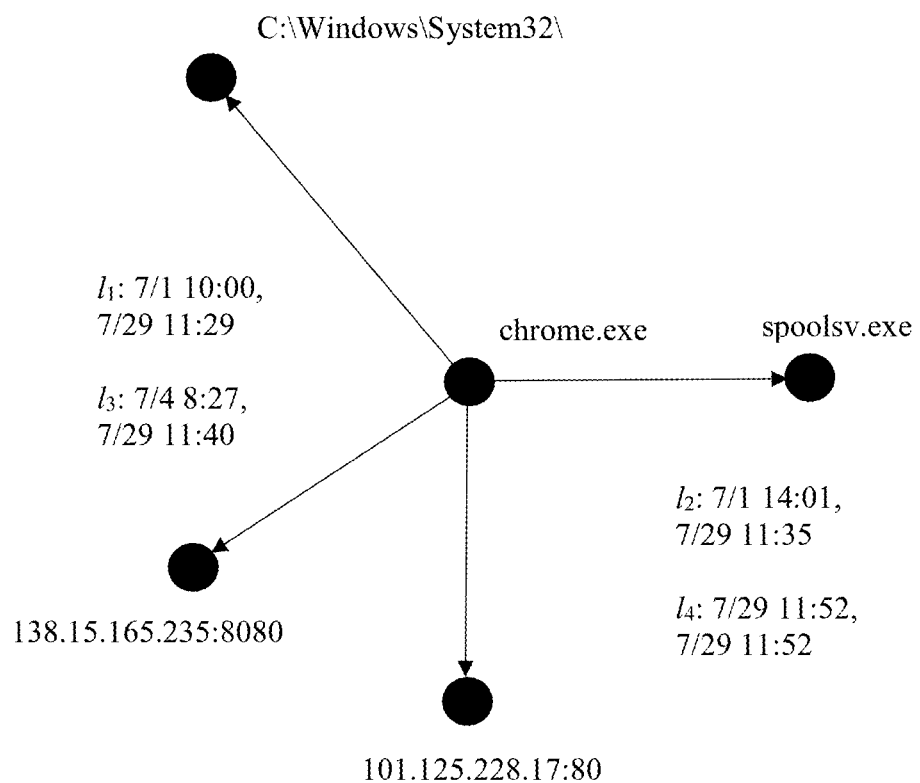
FIG. 4 is an example process-star graph of "chorme.exe," in accordance with embodiments of the present invention.

In a second example, as shown in FIG. 4, the process-star graph of "chrome.exe" is generated from the events of Table 2. In the center of the graph is the process node "chorme.exe," and there are four edges and four boundary nodes that represent the objects of "chorme.exe." Note that, the two files are merged as one node, specified by the path of their common folder. In the edges, the first and latest timestamp of monitoring events are stored. For example, $l_f$ shows that, "chorme.exe" has access to files in the folder "C:\Windows\System32\" before the monitoring event in 11:29 of 7/29, the first access timestamp is on 7/1.

In the process-star graph, if there is a monitoring event between the central process and the object entity, an edge will be constructed between both nodes. The first timestamp is set as the edge's construction time and the latest timestamp is always updated by the incoming events over the data stream. Note that the process-star graph does not store the total count of events between a pair of nodes because such information can be misleading. In real applications, many processes can initialize thousands of network connections or file access events in one second via the same edge. A large number of the total count does not indicate high traffic or a huge data transition on the edge.

The process-star graph is the core model for cause detection. However, only such a graph is not enough. In the stage of cause detection, the exemplary system has to frequently process the queries that select out all the graphs that contain a specific object. To efficiently process such queries, the system needs to build an inverted index for each object in advance.

Concerning the definition of object index, the object index I is a hash-map (e.g., a set of key-value pairs), I={<key, graph_list>}, the key is the object_id and the value is the list of the graphs that contain such an object.

In real applications, the process-star graph set Sp can be implemented as a hash-map, in which the key is the process id and the value is the corresponding process-star graph. In this way, the system can quickly retrieve the process-star graph of a specific process by the process id. And the graph_list of object index stores all the process ids of the process-star graphs that include the specific object.

The first procedure shows the detailed steps to construct and update the set of process-star graphs and object indexes over the streaming data. For each incoming event, the system first retrieves the subject process and checks whether a corresponding process-star graph exists or not (Steps 1 to 2). If the process-star graph does not exist, the system creates a new graph and adds it to the graph set (Steps 3 to 5). After that, the system retrieves the event's object entities and checks whether it is already in the graph (Steps 6 to 8). If the graph does not contain the entity node, a new node will be created and added to the graph (Steps 9 to 10). Meanwhile, a new index record will be added to the object index (Step 11). The edge between the pair of nodes is also created and added (Steps 13 to 15). In the next step, the exemplary system updates the timestamp for both nodes and edge (Step 16), and adds the process-start graph to the object index (Steps 17 to 18). Finally, the exemplary system outputs the updated graph set and index (Step 19).

Note that the first procedure is employed for both constructing the models and maintaining them to be up-to-date. The constructed process-star graphs and index can be saved in files and loaded by a different analysis server. For example, the users may construct the graphs from one deployment of enterprise A, and load the constructed graphs on the stream of another deployment of enterprise B.

The process automatically updates the process-star graphs and object index. It does not require the users to provide any specific information of the enterprise environment. Hence, it is feasible for system deployment in real applications.

Figure 5:
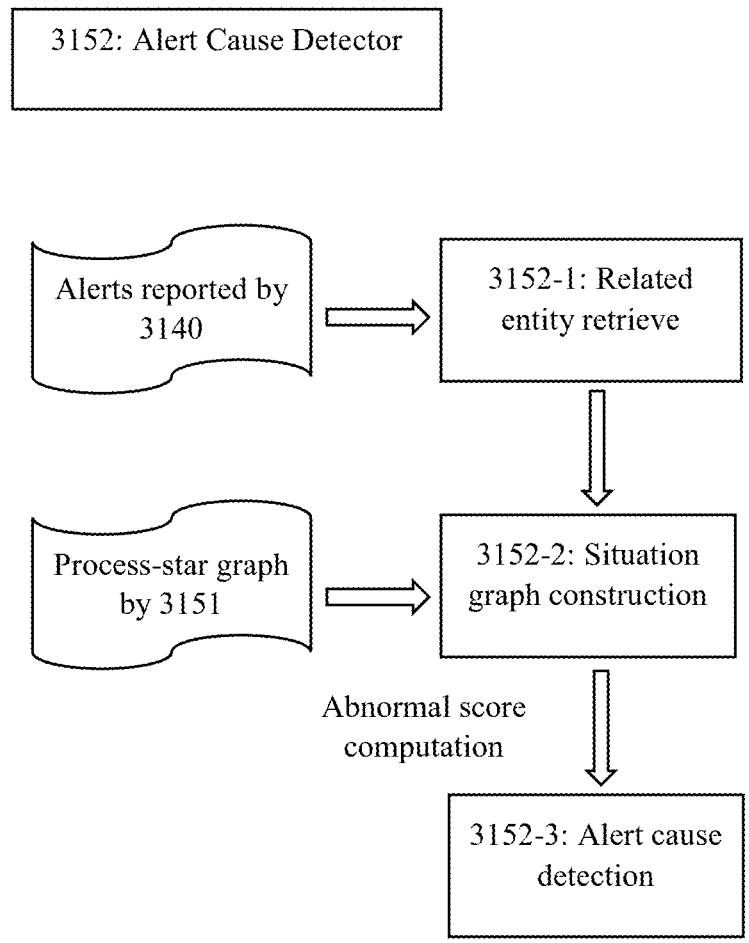
FIG. 5 is an example framework of an alert cause detector, in accordance with embodiments of the present invention.

Regarding the baseline construction and alert cause detection module 3152, the process-star graphs are used as the core model to interpret the alerts. The framework of the alert cause detector 3152 is shown in FIG. 5. There are at least three steps: (1) the system retrieves the related entities from the alert event and searches the corresponding process-star graphs with the help of object index; (2) the system constructs a situation-aware graph based on the retrieved process-star graphs; and (3) the system computes the abnormal scores for each related entity and determines the alert cause.

For each alert event, there are two entities as listed in the monitoring event definition, e.g., a subject process and an object entity, which can be a file, a network socket or another process. For the subject process, it is straightforward to retrieve the corresponding process-star graph by the process id. To retrieve the process-star graphs related to an object entity, the system first checks an object index to retrieve the graph list that contains the object, and then retrieves all the related graphs.

The second procedure shows the steps to retrieve process-star graphs related to the alerts. The exemplary system first retrieves the graph of the subject process (Steps 1 to 4); then Procedure 1: Constructing and Updating
Process-star Graphs and Object Index

| | |
|---|---|
| Input: | The incoming event e, the old process-star graph hash-map M, the old object index I; |
| Output: | The updated process-star graph hash-map M and object index I; |
| Step 1: | Retrieve the subject process' id p_id from e; |
| Step 2: | If M does not contain the key of p_id |
| Step 3: | Initialize $V_p$ based on p; |
| Step 4: | Initialize graph $G_p$ and set $V_p$ as the central node; |
| Step 5: | Add <p_id, $G_p$> to M; |
| Step 6: | Retrieve graph Gp from M by p_id; |
| Step 7: | Retrieve the object entity o from e; |
| Step 8: | If $G_p$ does not contain the node of entity o |
| Step 9: | Initialize node $V_o$ based on o; |
| Step 10: | Add $V_o$ to $G_p$; |
| Step 11: | Initialize new index record $i_o$ = <o_id, null>; |
| Step 12: | Add $i_o$ to object index I; |
| Step 13: | Initialize edge l between $V_p$ and $V_o$ ; |
| Step 14: | first(l) = timestamp(e); |
| Step 15: | Add l to $G_p$; |
| Step 16: | latest($V_p$) = timestamp (e), latest($V_o$) = timestamp (e), latest(l) = timestamp (e); |
| Step 17: | Retrieve index record $i_o$ by o_id; |
| Step 18: | Add Gp to the graph list of $i_o$; |
| Step 19: | Return $S_p$ and I; | the exemplary system checks the object index and retrieves the graph list of the object entity o, which contains the process ids of all the process-star graphs that contain o (Steps 5 to 6). Then, the system retrieves all the corresponding graphs and adds them to result set (Steps 7 to 10).

Procedure 2: Retrieving Related Entities and Process-star Graphs

| | |
|---|---|
| Input: | The alert event e, the process-star graph hash-map M, the object index I; |
| Output: | The set $S_e$ of process-star graphs that are related to alert e; |
| Step 1: | Initialize $S_e$; |
| Step 2: | Retrieve the subject process' id p_id from e; |
| Step 3: | Retrieve graph $G_p$ from M by p_id; |
| Step 4: | Add $G_p$ to $S_e$; |
| Step 5: | Retrieve the object entity's id o_id from e; |
| Step 6: | Retrieve the graph_list from I by o_id; |
| Step 7: | For each p_id in graph_list |
| Step 8: | Retrieve graph $G_o$ from M by p_id; |
| Step 9: | Add $G_o$ to $S_e$; |
| Step 10: | Return $S_e$; |

With all the related process-star graphs retrieved, the system can construct the situation-aware graph. The situation-aware graph is the model for alert interpretation. The situation-aware graph includes all the baselines from historical data and provides the necessary information to detect alert cause.

Regarding the definition for the situation-aware graph, given an alert event e, the situation-aware graph $G_e=<v_p, v_o, V_{ho}, V_{hp}, E>$, where $V_p$ is the node that represents the subject process p of e, $v_o$ is the node that represents the object entity o of e, $V_{ho}$ is the set of entity nodes that have been the object entity of process p in history, $V_{hp}$ is the set of process nodes that have been the subject process of object o in history, E is the set of edges between them.

The situation-aware graph is different from the process-star graph. The process-star graph has the process in the center and all the object entities on the boundary. In the center of a situation-aware graph, there are two entities, that is, the subject process and the object entity of the alert event, which are the candidates of the alert cause.

The situation-aware graph can be constructed from the set of related process-star graphs of an alert event. The steps of the third procedure are as follows: the system first retrieves subject process and object entity from the alert event and initializes the situation-aware graph (Steps 1 to 3). Then the exemplary system retrieves the process-star graph of the subject process, and adds all its historical object entities to the situation-aware graph (Steps 4 to 7). In the next step, the exemplary system retrieves the process-star graphs that include the object entity and adds all the historical subject processes to the situation-aware graph (Steps 8 to 11). Finally, the exemplary system returns the constructed graph (Step 12).

Procedure 3: Constructing the Situation-aware Graph

| | |
|---|---|
| Input: | The alert event e, set $S_e$ of process-star graphs that are related to alert e; |
| Output: | The situation-aware graph A of alert e; |
| Step 1: | Retrieve the subject process p and object entity o from e; |
| Step 2: | Initialize A by $v_p$ ← node of p and $v_o$ ← node of o; |
| Step 3: | Add an edge between $v_p$ and $v_o$; |
| Step 4: | Retrieve the process-star graph $G_p$ of p from $S_e$; |
| Step 5: | For each object $o_p$ in $G_p$; |
| Step 6: | Add the node of $o_p$ to A; |
| Step 7: | Add edge between the node of $o_p$ and $v_p$; |
| Step 8: | For each process-star graph $G_o$ that contains o in $S_e$ |
| Step 9: | Retrieve the subject process $p_o$ of $G_o$; |
| Step 10: | Add the node of $p_o$ to A; |
| Step 11: | Add edge between the node of $p_o$ and $v_o$; |
| Step 12: | Return A; |

Figure 6:
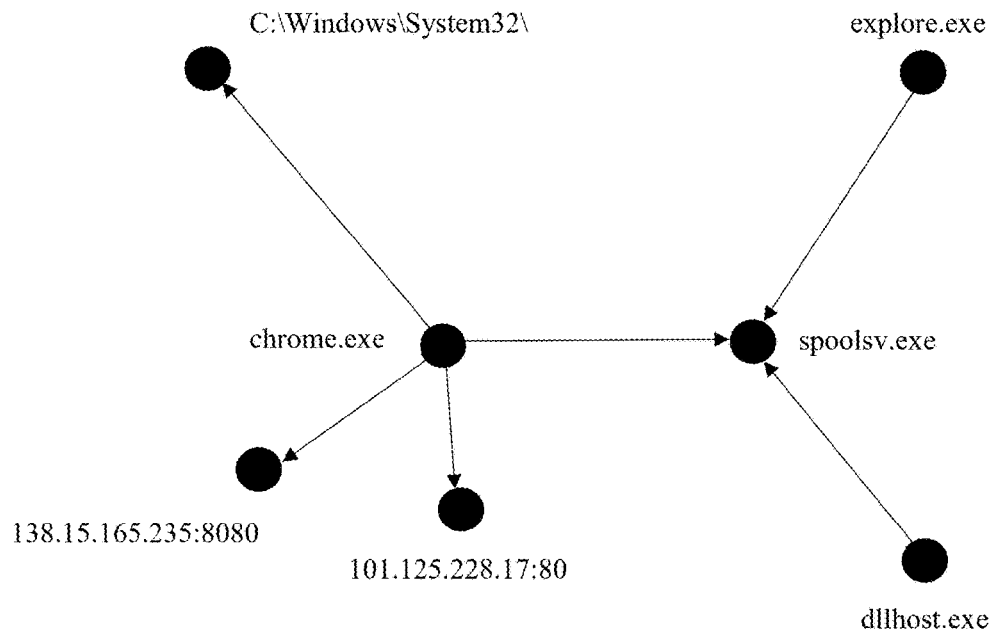
FIG. 6 is an example situation-aware graph of "chrome.exe," in accordance with embodiments of the present invention.

In a third example, FIG. 6 illustrates an example of the situation-aware graph. Suppose the detector reports an alert event of "chrome.exe forks spoolsv.exe." In the center of the situation-aware graph, the edge that represents this alert is tagged as a red solid line. The system searches the model of process-star graphs and retrieves all the object entities that chrome.exe has accessed before, including the file folder "C:\Windows\System32," the network connection socket to destination at "138.15.165.235:8080," etc. The system also retrieves the processes that have forked "spoolsv.exe" before, e.g., "explore.exe" and "dllhost.exe." These relationships are tagged as dashed edges. They are the baseline information that indicates how the normal situation should be.

The alert may be caused by either the process or the object entity, or both. Based on the situation-aware graph, an analysis can be conducted to find out which one caused the alert.

There are at least three factors in locating the alert cause: (1) which entity is relatively new? Usually the old one is more trustworthy but the new or unseen one is more suspicious (Seniority); (2) which entity is more stable? If one entity constantly has some new relationship with others, this one is likely to be a popular source or attack target, hence the probability of being alert cause is less (Stability); and (3) whether the process or object entity has similar relationship before (Similarity).

In the situational graph, the first timestamps of the entity nodes are retrieved from the model of process-star graphs. The seniority of an entity 710 is defined as follows.

Figure 7:
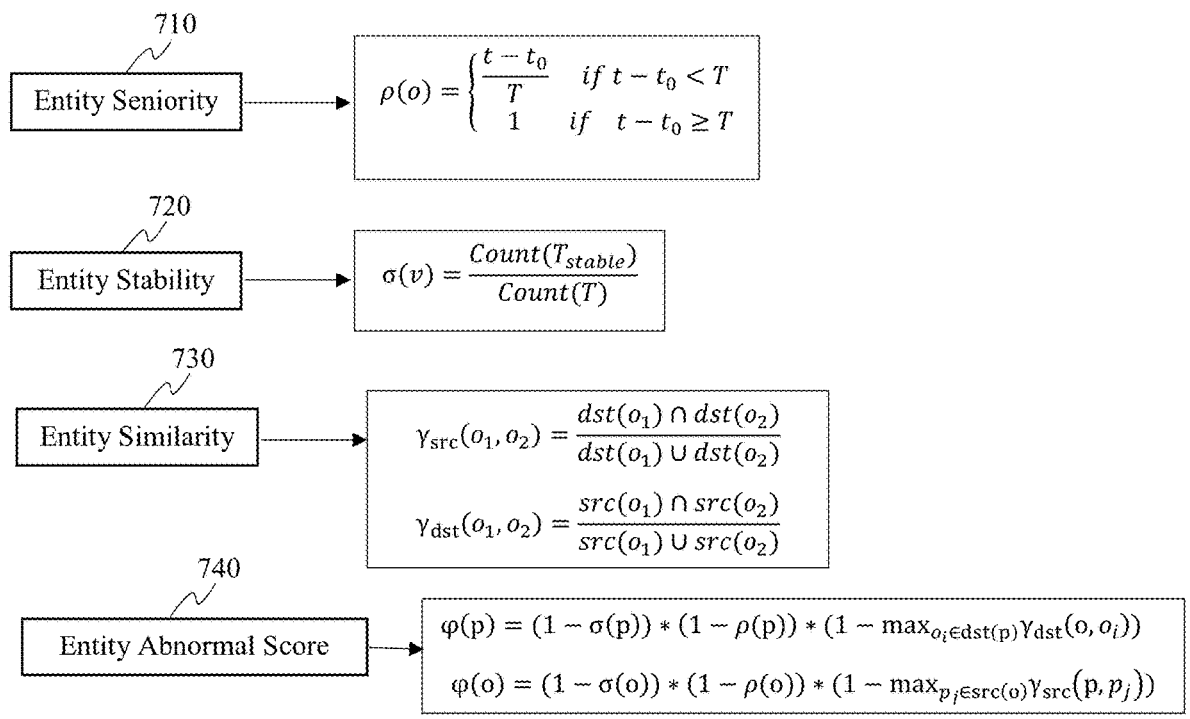
FIG. 7 are example equations for entity seniority, entity stability, entity similarity, and entity abnormal scores, in accordance with embodiments of the present invention.

The definition of entity seniority is given as: Let to be the first timestamp of an entity o, and t be the current timestamp. Let T be a user defined time threshold. The seniority of entity (710) o is computed as Eq.1 (FIG. 7).

$$\rho(o) = \begin{cases} \dfrac{t-t_0}{T} & \text{if } t-t_0 < T \\ 1 & \text{if } t-t_0 \geq T \end{cases} \qquad \text{Eq. 1}$$

Note that, the value range of seniority score ρ(o) is between 0 and 1. When the entity is first seen by the system, $t_0=t$, ρ(o)=0; if the history of the entity is equal to or larger than the user defined threshold, ρ(o)=1. The threshold T is given by the user. In one example, T can be set as two to four weeks.

In the situational-aware graphs, the history of updates can be checked for entity nodes based on the timestamp of the edges. Some entity nodes have edges with recent timestamps (e.g., relatively new edge), some other nodes may become stable with a set of old edges. The following measure is introduced to model the stability 720 of an entity node.

The definition of entity stability can be given as: Let o be an entity in the situation-aware graph, and m is a fixed time window length. The time period, from o's first timestamp to current timestamp, can be partitioned to a sequence of time windows, $T=\{T_0, T_1, T_2, \ldots T_n\}$, where $T_i$ is a time window with length m. If there is no new edge from/to o in window $T_i$, $T_i$ is defined as a stable window. The entity stability 720 is thus defined in Eq. 2 (FIG. 7), where Count($T_{stable}$) is the count of stable windows in which no edge connects from/to o, and Count(T) is the total number of windows.

$$\sigma(v) = \dfrac{\text{Count}(T_{stable})}{\text{Count}(T)} \qquad \text{Eq. 2}$$

The range of entity stability 720 is [0,1], when an entity has no stable window, i.e., the entity always has new edges in every window, the stability is 0. If all the windows are stable, the stability is 1.

In real applications, the window length is usually set as 24 hours (a day). Hence the stability of an entity is determined by the days that the entity has no new edges and the total number of days. Note that, the entity stability can be easily maintained over the stream, the system only stores two numbers of Count($T_{stable}$) and Count(T) for each entity, and updates both in every 24 hours. The time complexity of computing entity stability is O(1).

Beside seniority and stability, another factor of alert cause detection is the entity similarity 730, which indicates whether the one entity has connected or been connected to a similar entity before.

The definition for entity similarity 730 can be given as: Let $o_1$ and $o_2$ be two entities of the situation-aware graph, dst(o) and src(o) denote the destinations/sources that have edges from/to v. The entity similarity 730 is defined as Eqs. 3 and 4 (FIG. 7).

$$\gamma_{src}(o_1, o_2) = \dfrac{dst(o_1) \cap dst(o_2)}{dst(o_1) \cup dst(o_2)} \qquad \text{Eq. 3}$$

$$\gamma_{dst}(o_1, o_2) = \dfrac{src(o_1) \cap src(o_2)}{src(o_1) \cup src(o_2)} \qquad \text{Eq. 4}$$

Note that, $o_1$ and $o_2$ must be the same type, e.g., they are both process nodes, or both are file nodes. The source similarity (Eq.3) between two nodes is indeed the Jaccard similarity of their destinations, and the destination similarity (Eq.4) is the Jaccard similarity of the sources that have connected to both nodes. The range of node similarity is [0,1]. If both nodes have the same sources/destinations in the graph, their similarity is 1, if they have no common source/destination, the similarity is 0.

Based on the above three measures, now the entity abnormal score 740 can be defined as follows. The definition of the entity abnormal score 740 can be given as: the abnormal score of process node p is computed as shown in Eq. 5 (FIG. 7), where σ(p) is the stability of p, ρ(p) is the process seniority and dst(p) is the object entity set that p has connected to in the situation-aware graph. Similarly, the abnormal score of object node o is computed in Eq. 6 (FIG. 7), where src(o) is the process node set that has connection to o.

$$\varphi(p)=(1-\sigma(p))*(1-\rho(p))*(1-\max_{o_i \in dst(p)} \gamma_{dst}(o,o_i)) \qquad \text{Eq. 5}$$

$$\varphi(o)=(1-\sigma(o))*(1-\rho(o))*(1-\max_{p_j \in src(o)} \gamma_{src}(p,p_j)) \qquad \text{Eq. 6}$$

Note that, the measure of entity similarity is different from the measures of stability and seniority. The stability and seniority is defined on a single entity, but the similarity is a score defined by comparing two entities. In Eq. 5, the entity similarity is compared between o and every historical object entity of p, and the maximum is employed to compute the abnormal score. The intuition is that, if the method can find one entity that p has connected in history with high similarity to o, then p is likely to connect to o and it is not abnormal.

The fourth procedure shows the steps of alert cause detection. The exemplary system takes the situation-aware graph and the abnormal threshold as input, and outputs the alert cause entities (the alert cause can be the process or the object, or both of them). The exemplary system first retrieves the process and object, computes their stability and seniority (Steps 1 to 3). Then the exemplary system retrieves all the objects that the process has connected to, computes the similarity scores and uses the maximum one to further compute the abnormal score of the process (Steps 4 to 6). If the abnormal score is larger than threshold, the process is an alert cause and thus can be added to the output set (Step 7). The exemplary system carries out the same steps for the object entity o (Steps 8 to 11).

| Procedure 4: Alert Cause Detection | |
| --- | --- |
| Input: | The situation-aware graph G and the abnormal threshold δ |
| Output: | The set of problematic entities $S_P$; |
| Step 1: | Retrieve the process p and object o from G; |
| Step 2: | Compute the seniority of p and o; //Eq. 1 |
| Step 3: | Compute the stability of p and o; //Eq. 2 |
| Step 4: | For each object $o_i$ has been connected by p; |
| Step 5: | Compute the similarity between $o_i$ and o; //Eq. 3 |
| Step 6: | Compute the entity abnormal score of p; //Eq. 5 |
| Step 7: | If $\varphi(p) > \delta$ then add p to $S_P$; |
| Step 8: | For each process $p_j$ has connected to o; |
| Step 9: | Compute the similarity between $p_j$ and p; //Eq. 4 |
| Step 10: | Compute the entity abnormal score of o; //Eq. 6 |
| Step 11: | If $\varphi(o) > \delta$ then add o to $S_P$; |
| Step 12: | Return $S_P$; |

Regarding aftermath tracing and alert interpretation, the component of alert cause detection finds out abnormal entities that cause the alerts. For security applications, it is useful for the end users to trace following events after the alert has been detected. For example, if a process is detected as an alert cause, the end users want to check which entity the process has accessed after the alert event. Such information can be used to recover the damages caused by the alert.

Figure 8:
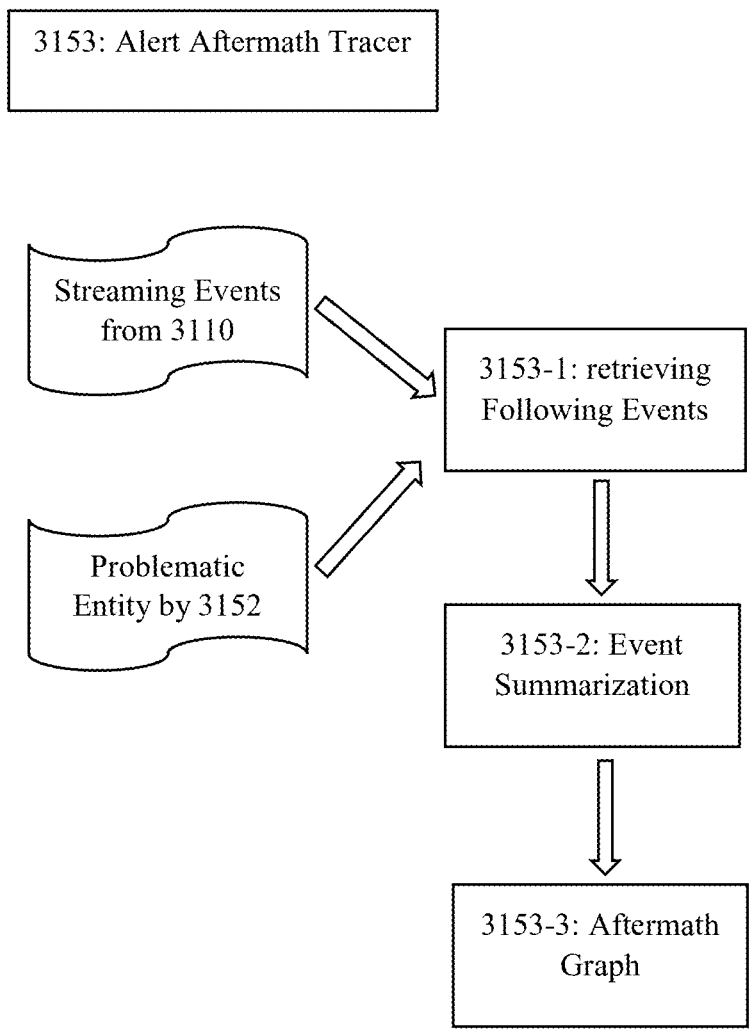
FIG. 8 is an example framework of an aftermath tracer, in accordance with embodiments of the present invention.

The framework of the alert aftermath tracer (3153) is shown in FIG. 8. There are at least two steps: (1) the system matches the problematic entities (e.g., detected alert cause) to streaming data and retrieves following events (3153-1); and (2) the system summarizes the events (3153-2) as an aftermath graph (3153-3) for output.

The definition for aftermath event is as follows: Let o be a problematic entity and e be a monitoring event, e is a aftermath event to o if it satisfies one of the following condition:

if o is a process and e is a process-process event, process (e) or object (e) has the same process name with o;

if o is a file or internet socket, object(e) has the same process name and type with o;

The definition for aftermath entity can be as follows: Let o be a problematic entity and e be an aftermath event, $o_a$ is a aftermath entity retrieved from e:

if o is a process, $o_a$ is retrieved as the object entity of e;

if o is a file or internet socket, $o_a$ is retrieved as the process of e;

The alert aftermath tracer stores all the problematic entities in memory, for each incoming event, the tracer matches the event with each problematic entity and selects it out if it is an aftermath event. However, there is an issue in that there may be a large number of redundant events, e.g., a problematic process may access a specific file for multiple times. If the system stores every aftermath event, the memory will soon run out. To solve this issue, an aftermath edge is employed.

The definition of the aftermath edge can be given as follows: Let $v_o$ be a problematic entity and $V_a$ be the aftermath entity, the aftermath edge l is a 5-tuple, l=<$v_o$, $v_a$, first_timestamp, last_timestamp, access_times>, where "first_timestamp" and "last_timestamp" stores the first and latest timestamps when the problematic entity accesses the aftermath entity, and "access_times" record the total access times.

Based on the definition of the entity abnormal score, the system can compress thousands of the repeated and redundant aftermath events between a pair of entities to a single edge. The aftermath graph 3153-3 can be defined as follows:

The definition of the aftermath graph can be given as follows: Let o be a problematic entity, the aftermath graph $G_o$=<$v_o$, $V_r$, L>, where $v_o$ is the node that represents entity o, $V_r$ is the set nodes for aftermath entities, and L={l} is the set of aftermath edges between them.

The aftermath graph is constructed incrementally over the streaming data. As listed in the fifth procedure below, for each incoming event, the exemplary system first checks whether the event is aftermath to one of the problematic entity (Step 1). If the incoming event is an aftermath event, the exemplary system checks whether the aftermath graph exists or not. If not, it will create a new one (Steps 2 to 4). Then the exemplary system retrieves the aftermath entity from the event, and adds it to the aftermath graph if it is not already included (Steps 5 to 8). If the aftermath graph already contains the aftermath entity, the exemplary system only updates the timestamps and access times on the corresponding edge (Steps 11 to 13). Finally, the updated graph is returned (Step 14).

In Procedure 5, the exemplary system only needs to maintain a set of aftermath graphs and does not need to store all the aftermath events. Thus, the memory usage is limited and the procedure is efficient to process big data.

| Procedure 5: Aftermath Graph Construction | |
| --- | --- |
| Input: | The incoming event e, the set of problematic entities $S_P$, and the set of alert aftermath graph $S_G$; |
| Output: | The updated set of alert aftermath graph $S_G$; |
| Step 1: | For each problematic entity o in $S_P$ |
| Step 2: | If e is an aftermath event to o |
| Step 3: | If $S_G$ does not contain the aftermath graph $G_o$ |
| Step 4: | Initialize graph $G_o$ by adding o to a new graph; |
| Step 5: | Retrieve the aftermath graph $G_o$ from $S_G$; |
| Step 6: | Retrieve the aftermath entity from e as $o_r$; |
| Step 7: | If $G_o$ does not contain $o_r$ |
| Step 8: | Add $o_r$ to $G_o$; |
| Step 9: | Initialize aftermath edge l = (o, $o_r$); |
| Step 10: | Add l to $G_o$; |
| Step 11: | Else |
| Step 12: | Retrieve the aftermath edge l = (o, $o_r$) from $G_o$; |
| Step 13: | Update the last_timestamp and access_times of l; |
| Step 14: | Return $S_G$; |

Figure 9:
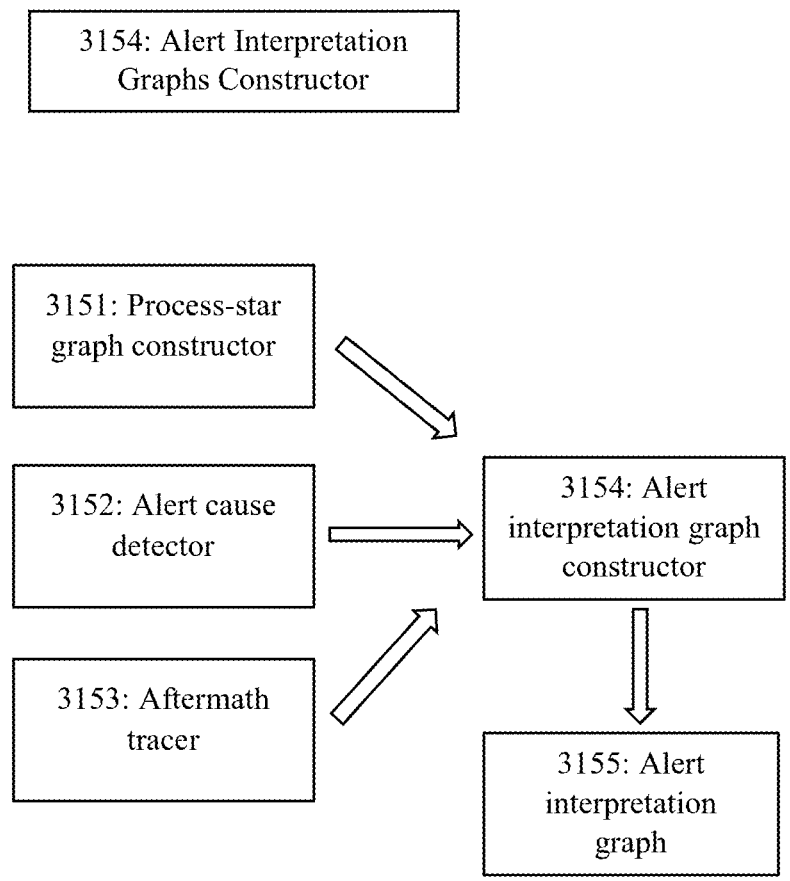
FIG. 9 is an example framework of an alert interpretation graph constructor, in accordance with embodiments of the present invention.

Finally, the interpretation graph constructor integrates all the results to generate a whole picture for the end user. The framework of this component (3154) is shown in FIG. 9. This component reads the alert cause (output by 3152) and constructs the baselines from process-star graphs (output by 3151). Then the component integrates the aftermath graph from 3153 to visually illustrate the alert.

The sixth procedure below lists the steps of constructing the interpretation graph. At first, the exemplary system retrieves the related entities to the alert and constructs the situation-aware graph as baseline (Steps 1 to 2). The detailed processes are identical to Procedures 2 and 3. Then the exemplary system reads in the alert cause and labels it out on the graph (Step 3). After that, the exemplary system merges the situation-aware graph with the aftermath graph (Steps 4 to 5). Finally, the alert interpretation graph 3155 is output to end users (Step 6).

| | |
|---|---|
| Procedure 6: Constructing Alert Interpretation Graphs | |
| Input: | The alert event e, the process-star graph hash-map M, the object index I, the set of problematic entities $S_p$, and the set of alert aftermath graph $S_G$; |
| Output: | The alert integration graph $G_i$; |
| Step 1: | Retrieving the related entities and process-star graphs to e; //Procedure 2 |
| Step 2: | Constructing the situation-aware graph $G_s$; //Procedure 3 |
| Step 3: | Label out the alert cause on $G_s$; |
| Step 4: | Initialize $G_i$ based on $G_s$; |
| Step 5: | Merge $G_a$ to $G_i$; |
| Step 6: | Return $G_i$; |

Figure 10:
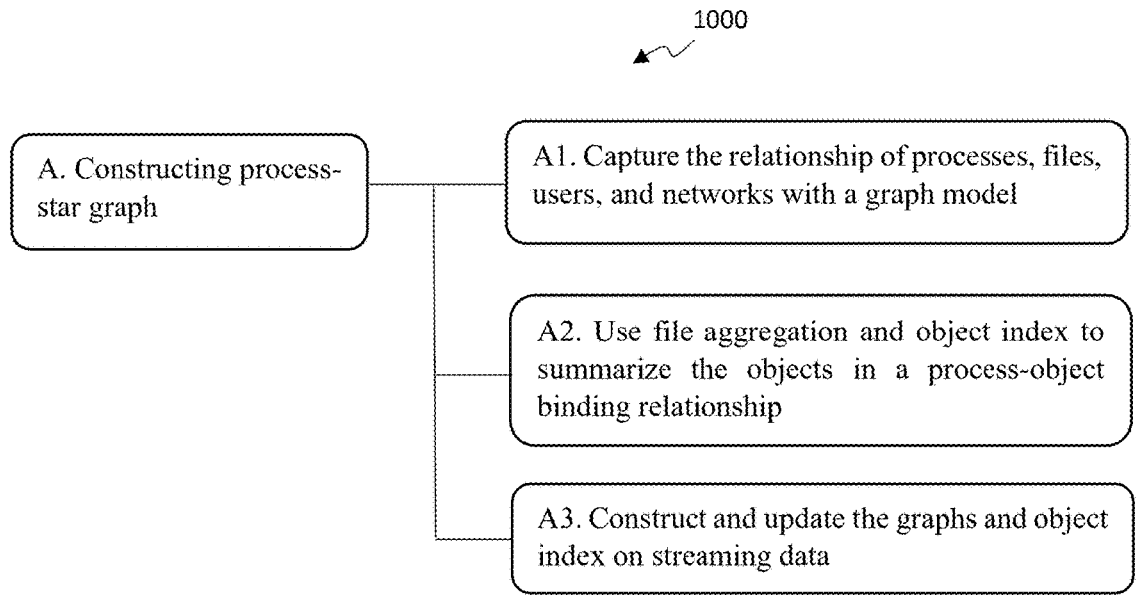
FIG. 10 is an example claim tree of a process-star graph model construction, in accordance with embodiments of the present invention.

FIG. 10 is an example claim tree 1000 of a process-star graph model construction, in accordance with embodiments of the present invention.

The process-star graph is constructed by capturing the relationship of processes, files, users, and networks with a graph model, employing file aggregation and object index to summarize the objects in process-object binding relationships, and constructing and updating the graphs and object index on streaming data.

Figure 11:
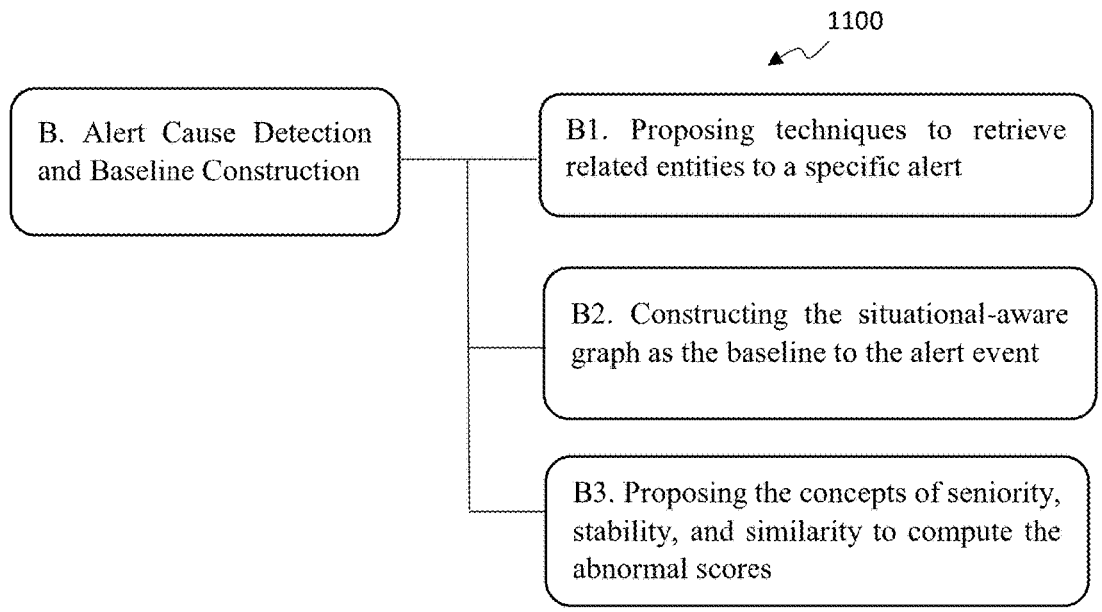
FIG. 11 is an example claim tree of alert cause detection, in accordance with embodiments of the present invention.

FIG. 11 is an example claim tree 1100 of alert cause detection, in accordance with embodiments of the present invention.

The alert cause detection and baseline construction are performed by employing techniques to retrieve related entities to a specific alert, constructing the situational-aware graph as the baselines to the alert event, and employing seniority, stability, and similarity to compute the abnormal scores.

Figure 12:
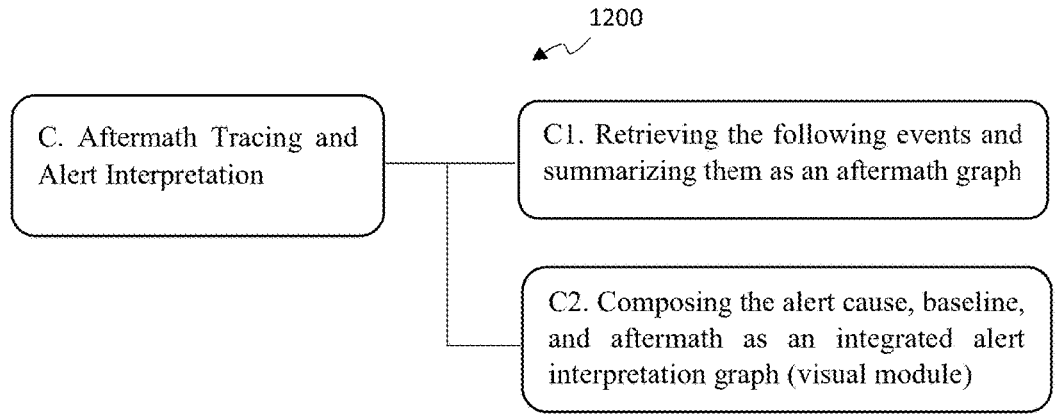
FIG. 12 is an example claim tree of aftermath tracing, in accordance with embodiments of the present invention.

FIG. 12 is an example claim tree 1200 of aftermath tracing, in accordance with embodiments of the present invention.

The aftermath tracing and alert interpretation can be performed by retrieving the following events and summarizing them as an aftermath graph, and composing the alert cause, baseline, and aftermath as an integrated interpretation graph.

Therefore, the exemplary embodiments of the present invention introduce a Graph-based Alert Interpreting Engine (GAIE) to find and trace the aftermath in large enterprise security systems. The core of GAIE is a process-star graph model. The center of the graph is a process node, and other entity nodes related to the process are on the boundaries. The graph is constructed via streaming data and maintained dynamically. When an alert is reported by a detector, GAIE matches the alert to a corresponding process-star graph and retrieves related entities. In the next step, GAIE computes an abnormal score for each entity and selects the one with highest score as alert cause. Meanwhile, the exemplary system also retrieves historical normal activities as baselines. After that, the exemplary system traces following events on incoming data. Finally, the exemplary system summarizes the alert cause, baseline, and aftermath as an integrated result to output to the end users.

Regarding constructing and maintaining the process-star graph model, traditional methods cannot construct the process-star graphs on streaming data. Specifically, the process-star graph (A1), is a novel model for the relationship between the process, file, user and other entities. The process-star graph summarizes the relationship of a process and its objects in a concise format. The object index (A2) is a tool to help efficiently retrieve the process-star graphs by a given object.

Regarding alert cause detection, traditional alert cause detection methods cannot effectively find out the entity that causes the alerts, since they do not have the baselines. The exemplary method constructs the baselines (B1 and B2) from the process-star graphs. Three new measures are introduced to compute the abnormal score of the entity and find out the alert cause (B3).

Regarding aftermath tracing, traditional methods cannot generate meaningful results, since the aftermath events may be too many to trace. The aftermath graph summarizes the huge events to meaningful graphs (C1). The exemplary embodiments integrate the alert cause, baseline, and aftermath of the alert to interpret the alerts (C2).

The exemplary method automatically interprets alerts in security monitoring solutions for large enterprise systems. The exemplary method does not need any information in advance (e.g., training datasets, pre-defined models, etc.). Thus, it is more feasible for the real deployment scenario that the end users do not know alert patterns. The exemplary method conducts alert interpretation in real time. The engine maintains the models over streaming data and uses them for alert analysis simultaneously. Hence, the engine can be used for security tasks of real-time monitoring and intrusion detection. The exemplary method significantly reduces the time that the end users spend on processing the alerts. Based on experimental data, about 80% of the time is saved to process the alerts by employing the exemplary embodiments of the present invention.

Figure 13:
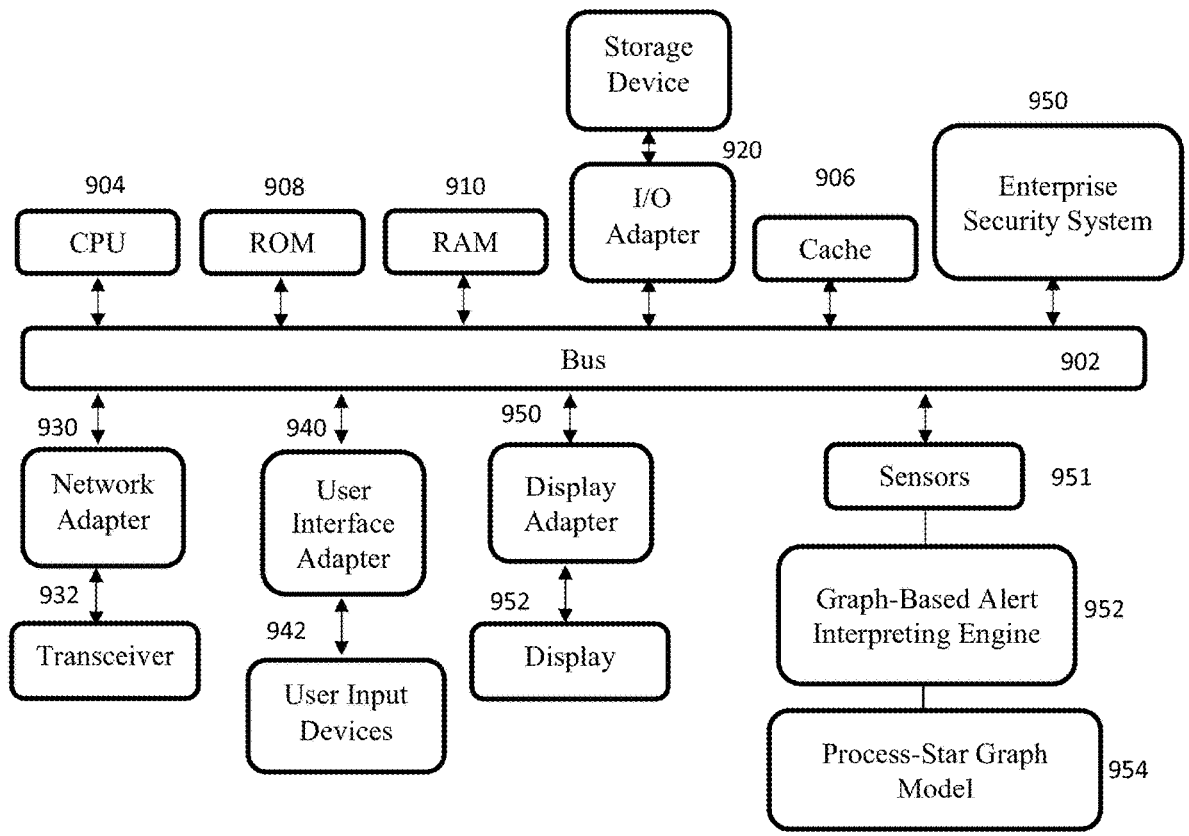
FIG. 13 is a block/flow diagram of an exemplary alert interpretation processing system, in accordance with embodiments of the present invention.

FIG. 13 is a block/flow diagram of an exemplary alert interpretation processing system, in accordance with embodiments of the present invention.

The processing system includes at least one processor or processor device (CPU) 904 operatively coupled to other components via a system bus 902. A cache 906, a Read Only Memory (ROM) 908, a Random Access Memory (RAM) 910, an input/output (I/O) adapter 920, a network adapter 930, a user interface adapter 940, and a display adapter 950, are operatively coupled to the system bus 902. Additionally, a power management system 950 is operatively coupled to the system bus 902. An enterprise security system 950 can be connected to the bus 902. The graph-based alert interpretation engine 952 employing a process-star graph model 954 can be connected to the bus 902. The graph-based alert interpretation engine 952 can receive data from a plurality of detectors or a plurality of sensors 951.

A storage device 922 is operatively coupled to system bus 902 by the I/O adapter 920. The storage device 922 can be any of a disk storage device (e.g., a magnetic or optical disk storage device), a solid state magnetic device, and so forth.

A transceiver 932 is operatively coupled to system bus 902 by network adapter 930.

User input devices 942 are operatively coupled to system bus 902 by user interface adapter 940. The user input devices 942 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 942 can be the same type of user input device or different types of user input devices. The user input devices 942 are used to input and output information to and from the processing system.

A display device 952 is operatively coupled to system bus 902 by display adapter 950.

Of course, the alert interpretation processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, processor devices, controllers, memories, and so forth, in various configurations can also be utilized as readily appreciated by one of ordinary skill in the art. These and other variations of the alert interpretation processing system are readily contemplated by one of ordinary skill in the art given the teachings of the present invention provided herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method executed on a processor for implementing alert interpretation in enterprise security systems, the method comprising:
    employing a plurality of sensors to monitor streaming data from a plurality of computing devices;
    generating alerts based on the monitored streaming data;
    employing an alert interpretation module to interpret the alerts, the alert interpretation module including:
        a process-star graph constructor for retrieving relationships from the streaming data to construct process-star graph models; and
        an alert cause detector for analyzing the alerts based on the process-star graph models to determine an entity that causes an alert,
    wherein the alert interpretation module further includes an aftermath tracer for monitoring all the following events of the entity that causes the alert, and an information integrator for integrating alert cause, aftermath, and baseline information to generate a result graph on a visualization component to allow users to interpret the alerts;
    wherein the alert cause detector retrieves related entities from an entity that caused the alert and constructs a situation-aware graph based on retrieved process-star graphs;
    wherein the alert cause detector further computes abnormal scores for each related entity and determines a cause for the alert;
    wherein a center of the process-star graph is a process and all object entities are located on a boundary;
    wherein the situation-aware graph has two entities in the center;
    wherein the two entities are a subject process and an object entity;
    wherein a cause of the alert can be determined based on entity seniority, entity stability, and entity similarity; and
    wherein the entity seniority is computed by $$\rho(o) = \begin{cases} \frac{t-t_0}{T} & \text{if } t-t_0 < T \\ 1 & \text{if } t-t_0 \geq T \end{cases},$$

the entity stability is computed by $$\sigma(v) = \frac{\text{Count}(T_{stable})}{\text{Count}(T)},$$

and the entity similarity is computed by $$\gamma_{src}(o_1, o_2) = \frac{dst(o_1) \cap dst(o_2)}{dst(o_1) \cup dst(o_2)}$$

and $$\gamma_{dst}(o_1, o_2) = \frac{src(o_1) \cap src(o_2)}{src(o_1) \cup src(o_2)},$$

where T is a time threshold, Count($T_{stable}$) is a count of stable windows in which no edge connects from/to o, Count(T) is a total number of windows, and dst(o) and src(o) denote destinations/sources that have edges from/to v.

2. The method of claim 1, wherein an entity abnormal score for a process node is computed by $\varphi(p)=(1-\sigma(p))*(1-\rho(p))*(1-\max_{o_i \in dst(p)}\gamma_{dst}(o,o_i))$ and an entity abnormal score for an object node is computed by $\varphi(o)=(1-\sigma(o))*(1-\rho(o))*(1-\max_{p_j \in src(o)}\gamma_{src}(p,p_j))$, where p is entity seniority, σ is entity stability, γ is entity similarity, and p is a process.

3. A system for implementing alert interpretation in enterprise security systems, the system comprising:
    a memory; and
    a processor device in communication with the memory, wherein the processor device is configured to:
        employ a plurality of sensors to monitor streaming data from a plurality of computing devices;
        generate alerts based on the monitored streaming data;
        employ an alert interpretation module to interpret the alerts, the alert interpretation module including:
            a process-star graph constructor for retrieving relationships from the streaming data to construct process-star graph models; and
            an alert cause detector for analyzing the alerts based on the process-star graph models to determine an entity that causes an alert,
        wherein the alert interpretation module further includes an aftermath tracer for monitoring all the following events of the entity that causes the alert, and an information integrator for integrating alert cause, aftermath, and baseline information to generate a result graph on a visualization component to allow users to interpret the alerts;
        wherein the alert cause detector retrieves related entities from an entity that caused the alert and constructs a situation-aware graph based on retrieved process-star graphs;
        wherein the alert cause detector further computes abnormal scores for each related entity and determines a cause for the alert;
        wherein a center of the process-star graph is a process and all object entities are located on a boundary;
        wherein the situation-aware graph has two entities in the center;
        wherein the two entities are a subject process and an object entity;
        wherein a cause of the alert can be determined based on entity seniority, entity stability, and entity similarity; and
    wherein the entity seniority is computed by $$\rho(o) = \begin{cases} \frac{t-t_0}{T} & \text{if } t-t_0 < T \\ 1 & \text{if } t-t_0 \geq T \end{cases},$$

the entity stability is computed by $$\sigma(v) = \frac{\text{Count}(T_{stable})}{\text{Count}(T)},$$

and the entity similarity is computed by $$\gamma_{src}(o_1, o_2) = \frac{dst(o_1) \cap dst(o_2)}{dst(o_1) \cup dst(o_2)}$$

and $$\gamma_{dst}(o_1, o_2) = \frac{src(o_1) \cap src(o_2)}{src(o_1) \cup src(o_2)},$$

where T is a time threshold, Count ($T_{stable}$) is a count of stable windows in which no edge connects from/to o, Count(T) is a total number of windows, and dst(o) and src(o) denote destinations/sources that have edges from/to v.

4. A computer-implemented method executed on a processor for implementing alert interpretation in enterprise security systems, the method comprising:
employing a plurality of sensors to monitor streaming data from a plurality of computing devices;
generating alerts based on the monitored streaming data;
automatically analyzing the alerts by using a graph-based alert interpretation engine employing process-star graph models;
retrieving a cause of the alerts, an aftermath of the alerts, and baselines for the alert interpretation, the cause of the alerts determined based on entity seniority, entity stability, and entity similarity;
computing abnormal scores from the entity seniority, the entity stability, and the entity similarity; and
integrating the cause of the alerts, the aftermath of the alerts, and the baselines into an alert interpretation graph output to a user interface of a user device,
wherein the entity seniority is computed by $$\rho(o) = \begin{cases} \dfrac{t - t_0}{T} & \text{if } t - t_0 < T \\ 1 & \text{if } t - t_0 \geq T \end{cases},$$

the entity stability is computed by $$\sigma(v) = \frac{\text{Count}(T_{stable})}{\text{Count}(T)},$$

and the entity similarity is computed by $$\gamma_{src}(o_1, o_2) = \frac{dst(o_1) \cap dst(o_2)}{dst(o_1) \cup dst(o_2)}$$

and $$\gamma_{dst}(o_1, o_2) = \frac{src(o_1) \cap src(o_2)}{src(o_1) \cup src(o_2)},$$

where T is a time threshold, Count($T_{stable}$) is a count of stable windows in which no edge connects from/to o, Count(T) is a total number of windows, and dst(o) and src(o) denote destinations/sources that have edges from/to v.

* * * * *